US005998044A

United States Patent [19]

Limbach et al.

[11] Patent Number: 5,998,044

[45] Date of Patent: Dec. 7, 1999

[54] ALUMINIUM SHEET WITH ROUGH SURFACE

[75] Inventors: Peter Karl Ferdinand Limbach, Goettingen, Germany; Martin Philip Amor, Banbury; Jonathan Ball, Clifton, both of United Kingdom

[73] Assignee: Alcan International Limited, Montreal, Canada

[21] Appl. No.: 08/615,217

[22] PCT Filed: Sep. 21, 1994

[86] PCT No.: PCT/GB94/02050

§ 371 Date: May 20, 1996

§ 102(e) Date: May 20, 1996

[87] PCT Pub. No.: WO95/08408

PCT Pub. Date: Mar. 30, 1995

[30] Foreign Application Priority Data

Sep. 21, 1993 [EP] European Pat. Off. .............. 93307454

[51] Int. Cl.[6] .......................... B32B 15/04; B32B 15/20; B23P 9/00; B41N 1/04

[52] U.S. Cl. .......................... 428/687; 428/650; 428/332; 428/457; 101/453; 430/302

[58] Field of Search .................................... 428/457, 544, 428/687, 650, 332, 339; 430/300, 302; 101/453, 459; 148/549, 550, 551

[56] References Cited

U.S. PATENT DOCUMENTS

| | | | |
|---|---|---|---|
| 4,301,229 | 11/1981 | Sakaki et al. | 430/158 |
| 4,581,996 | 4/1986 | Matzer | 101/459 |
| 4,680,250 | 7/1987 | Kitamura et al. | 430/302 |
| 5,061,591 | 10/1991 | Nakanishi | 430/159 |
| 5,427,889 | 6/1995 | Saikawa et al. | 430/204 |

FOREIGN PATENT DOCUMENTS

| | | |
|---|---|---|
| 115678 | 8/1984 | European Pat. Off. . |
| 272528 | 9/1988 | European Pat. Off. . |
| 03106531 | 5/1991 | Japan . |
| 2001559 | 7/1977 | United Kingdom . |

OTHER PUBLICATIONS

R. Akeret, Aluminum, 68: 318–21 (1992) no month.

P.F. Thompson, J. Austral. Inst. Met. 15: 34–46 (1970) no month.

*Primary Examiner*—John J. Zimmerman

*Assistant Examiner*—Michael LaVilla

*Attorney, Agent, or Firm*—Cooper & Dunham LLP

[57] ABSTRACT

Aluminium sheet suitable for use as a lithographic plate support has a surface that is uniformly rough by virtue of a rippled topography having an aspect ratio of at least 1.3 on a ale of 5–200 μm and a superimposed pitted surface on a scale of 1–20 μm.

4 Claims, 5 Drawing Sheets

SAMPLE A TABLE 2

AS ROLLED 20 UM, HARD FOIL, BRIGHT SIDE

AS ROLLED 20 UM, HARD FOIL, MATT SIDE

EC GRAINED, 20s, 20 UM, HARD FOIL, BRIGHT SIDE

EC GRAINED, 20s, 20 UM, HARD FOIL, MATT SIDE

SAMPLE A TABLE 2

ALUMINIUM SHEET WITH ROUGH SURFACE

This invention is directed to rolled aluminium sheet having a surface that is rough, and to a method of making the sheet. Although other uses are envisaged, the main application of this rough-surface aluminium sheet is expected to be as lithographic plate supports.

Most lithographic printing is from aluminium plates. These are typically 0.15 to 0.51 mm thick, depending on the size and type of press, although thinner sheets laminated to supports are also used. Aluminium sheet for lithographic plates is generally produced by rolling. This results in a metallurgical structure which is elongated in the rolling direction. The surface of the rolled sheet has marks (roll lines) extending longitudinally, which are not desired in the final grained product, and careful preparation of the rolls is necessary to minimise this effect.

To make an aluminium sheet suitable for use as a lithographic plate support, the surface needs to be roughened or grained. Standard techniques for this include: mechanical graining by the use of balls or abrasives or wire brushing; electrochemical graining, by the application of an AC current in an acidic electrolyte; and chemical graining, by simple immersion in an etch. Roughening is carried out in order to enhance the adhesion of an organic coating on the support, and to improve the water retention properties of the uncoated support surface. Application to the support of a photosensitive layer, followed by irradiation and development, generally result in a lithographic plate having ink-receptive image areas which carry an organic coating, and water-retaining non-image areas, the latter generally being the uncovered support surface. For this purpose the aluminium sheet needs to be roughened on a scale of approximately 1 to 15 μm.

The cost of the graining or roughening step is an important part of the economics of lithographic plate support manufacture. One advantage of the method of the present invention is that it makes possible a reduction in the time and energy used for graining.

In a different field, aluminium foil e.g. for domestic purposes is generally made by pack rolling. By this technique, a pack of two or more ribbons of aluminium is passed between the rolls, and the rolled sheets thereafter separated. The aluminium ribbons need to carry sufficient lubricant to prevent welding of adjacent sheets in the nip of the rolls, but this is often present without the need for deliberate additions. When two ribbons are pack rolled, each of the resulting sheets has a bright surface, which was in contact with the roll; and a matt surface which was in contact with the other sheet. When a pack of more than two aluminium ribbons is pack rolled, all sheets except the two outermost ones have two matt surfaces.

Pack rolling has, as noted, been widely used for many years in the production of aluminium foil for the retail market. We are aware of two published proposals to use pack rolled aluminium sheet as a lithographic plate support. The first is in British patent specification 2,001,559 published in February 1979. The second is in Japanese patent application 57203593 published in December 1982. But in our hands, pack rolled aluminium sheet is not satisfactory as a lithographic plate support, because the organic material which is applied to form a lipophilic image area does not bond well and rapidly flakes off. To the best of applicants' knowledge, pack rolled aluminium sheet has never achieved commercial success as lithographic plate support; and certainly not for long print runs.

EP-A-115 678 describes a technique for preparing Al sheet for use as a lithographic plate support by repeated pack rolling.

This invention is based on an initial discovery that subjecting the matt surface of pack rolled aluminium sheet to a roughening or graining process dramatically improves the properties of the sheet as lithographic plate support. Only a minor roughening or graining treatment is necessary to achieve this effect. The inventors have analysed the topography of their roughened surfaces, and have defined novel criteria for high performance.

In one aspect, this invention provides rolled aluminium sheet having a surface that is uniformly rough by virtue of: a rippled topography comprising ridges and troughs extending transverse to the rolling direction; and a pitted structure.

The surface of the rolled aluminium sheet is uniformly rough because each of the rippled topography and the pitted structure extends over the whole surface, rather than being confined to particular regions. The generally coarser rippled topography and the generally finer pitted structure are superimposed on one another.

In another aspect the invention provides a method of making a sheet having a roughened surface, starting from two or more ribbons of aluminium, by the steps of:

a) Pack rolling the ribbons to provide a pack of two or more sheets and separating the pack into individual sheets each having a matt surface that faced another sheet of the pack during rolling, and b) Graining the said matt surface of the sheet.

This aluminium sheet is expected to be useful as lithographic plate support. For that use, it is preferred that the roughness of the rippled topography be sufficient to make the surface water-retentive, and the roughness of the pitted structure be sufficient to permit a layer of an organic material to become firmly bonded to the surface.

As noted above, it has long been well known that the lithographic plate grain provides protrusions for anchorage of an organic coating, to provide a lipophilic surface receptive to ink, and recesses which help the surface carry moisture. Applicants currently believe that the nature/extent/scale of the roughness required is different for each of these two different effects. Thus the rather coarse rippled topography that results from pack rolling provides a good moisture-receptive surface, but is not good as the basis for a firmly bonded organic layer. Conventional roughening on a finer scale is necessary to provide a good key for the firm adhesion of an applied organic layer. Lithographic plate supports having rough surfaces which meet both these criteria, may be novel materials in their own right, and can be manufactured in an economical way.

Pack rolling, as typically used in final passes for thin gauge aluminium foil production, provides an outer bright finish and an inner surface that has a matt appearance. When examined microscopically, it can be seen that the matt finish is not uniform but comprises surprisingly deep transverse linear features. The finish has the appearance of a rippled topography comprising ridges and troughs, whose major axis is transverse to the rolling direction. The aspect ratio of these features (i.e. the ratio of their length in a direction transverse to the rolling direction to their width in the rolling direction) may be at least 1.3, and typically in the range 1.5–4, although aspect ratios of 5 and greater are perfectly possible and within the scope of the invention. The average spacing between adjacent ridges (measured in the rolling direction) is typically in the range of 5–200 μm. The average roughness is typically of the same order as that of conventional commercial lithographic plate supports.

In rolled aluminium sheet, the metallurgical structure and the surface topography on the rolled side are strongly aligned in the rolling direction. The rippled topography on pack rolled sheet has been described by R. Akeret (Aluminium, Vol 68, 1992, 319–321), and by P. F. Thompson (J. Australian Inst. Metals, 15, 1970, 34–46). The scale and nature of the ripples can be modified by the choice of starting material. A fine rippled topography is produced on cold worked sheet and a coarser rippled topography on recrystallised sheet. The dimensions of the rippled topography also appear to depend to some extent on the rolling conditions employed, reduction during the final pass between the rolls, thickness of the rolled sheet, amount of lubricant on the matt surfaces of the sheets, etc. But it has not been found necessary to use unusual pack rolling conditions. The rippled topography that results from pack rolling is generally conducive to water retention, but not (at least not without further treatment) conducive to providing a key for firm bonding of applied organic coatings.

Superimposed on this rippled topography is a pitted structure comprising pits preferably having an average diameter of 1–20 $\mu$m. The technique used to achieve this pitted structure is not material to the invention. Suitable are the standard commercial roughening and graining techniques, including mechanical roughening, spark erosion, chemical graining, and particularly electrochemical graining. Chemical and electrochemical graining techniques typically give rise to pits having an aspect ratio (ratio of long axis to short axis of pits in the plane of the sheet) of less than 1.5 e.g. about 1.0. The extent of pitting needed to provide a key for firmly bonding an organic coating is quite slight. As shown in the examples below, an electrograining treatment involving a power input of 0.25 of that required commercially, provides excellent results, and it is expected that much milder graining than this will provide noticeable advantage. Preferably the extent of graining is from 1% to 80% of that performed on commercial single rolled aluminium sheet. But even when the extent of graining is 100% of that performed on commercial single rolled aluminium sheet, the resulting lithographic plate support is expected to be of excellent quality and is included within the scope of the invention.

The term aluminium is herein used to cover the pure metal and alloys in which aluminium is the major component. Preferred alloys for use in the present invention are those in the 1000, 3000, 5000 and 6000 series of the Aluminum Association Register, and also AlFeMn alloys in the 8000 series. The invention has the advantage that, because the pitting structure is not so critical, a wider range of alloys can be used.

The invention provides various advantages, both for the aluminium producer who rolls the aluminium sheet, and for the plate maker who converts the sheet into lithographic plate supports and then to lithographic plates. The latter can reduce the graining time normally necessary to a) produce the coarse pitted features required, and, b) cover up the roll lines as there is less directionality, thus reducing time and energy and eliminating the high degree of attack required on conventional substrates. The aluminium producer has the advantage of passing two aluminium ribbons through the mill for the final pass, thus increasing productivity. Also, when pack rolling to produce a matt surface, the roll surface topography is not of prime importance and so the special roll finishes currently used for final rolling lithographic sheet are not needed. Hence, much less fine grinding is required, representing considerable savings in roll production time.

In addition, it is important that lithographic sheet have a low surface electrical resistance which is amenable to electrograining and anodising, and in turn this means that the surface should be free of surface disruptions generated by interaction of the surface with the rolls. The matt surface of pack rolled sheet is expected to have a much reduced disturbed layer, thus minimising this problem.

Furthermore, current lithographic sheet has to be produced two-sided so that customers can use either side. This originates from the little used practice of graining on both sides. Producing a single-sided product that is recognised by plate makers as having to be in this form of necessity, means that the side destined to become the matt side can be treated more carefully during manufacture, i.e. can be kept upwards during rolling thus reducing handling damage from tables and guide rolls.

Different alloys can be employed if surface graining treatments only need to be light, or foil can be laminated to strip substrates (plastic or metal), thus separating the demands of mechanical properties and surface requirements.

The roughened surface of aluminium sheet for use as lithographic plate support generally carries an aluminium oxide film. This may be produced by anodising.

In addition to lithographic plate support, aluminium sheet according to this invention has various other uses:

- Capacitor foil.
- An improved surface finish for adhesion of organic coatings.
- Roller coated pretreatments tend to coat in a manner dictated by the topography. Conventional material with highly directional features allows the pretreatment to run into the troughs with less pretreatment covering the peaks. The less directional surface topography of sheets according to this invention, tends to hold the liquid in discrete wells and helps spread the liquid transversely to produce a more homogeneous covering not unlike a gravure roll.
- Matt products, i.e. clear lacquered or gold covered architectural coil.

BRIEF DESCRIPTION OF THE DRAWINGS

Reference is directed to the accompanying drawings, each of which is a photomicrograph at a magnification of about 640× so that the white bar is 50 $\mu$m in length.

DETAILED DESCRIPTION OF THE INVENTION

EXAMPLE 1

Profilometry measurements were made on samples of 1050A (9963) litho sheet 0.295 mm thick, both in the as-rolled condition, and after electrograining under simulated commercial conditions (30 seconds at 14 V in 1.0% nitric acid at an electrode spacing of 1.5 cm). Corresponding profilometry measurements were also made on 20 μm commercial 1200 foil, both as pack rolled with measurements being made on the bright and the matt surfaces, and after electrograining both surfaces under the above conditions.

Results are set out in the following Table 1, and are expressed in terms of $R_a$ and $R_z$ (DIN 4768) measured using a non-contact profilometer.

TABLE 1

| MATERIAL | $R_a$ (μm) | $R_z$ (μm) |
|---|---|---|
| 1050A (9963) As Rolled | 0.44 | 4.14 |
| 1050A (9963) Grained 30s | 1.2 | 10.0 |
| 1200 (20 pm, Hard, Bright) As Rolled | 0.35 | 3.17 |
| 1200 (20 pm, Hard, Matt) As Rolled | 1.09 | 9.92 |
| 1200 (20 pm, Hard, Bright) Grained 30s | 1.06 | 9.12 |
| 1200 (20 pm, Hard, Matt) Grained 30s | 1.14 | 9.50 |

The roughness of the matt side of the pack rolled 1200 sample, both as rolled and after graining, was similar to that of the grained 1050A litho sheet sample.

EXAMPLE 2

Figure 1:
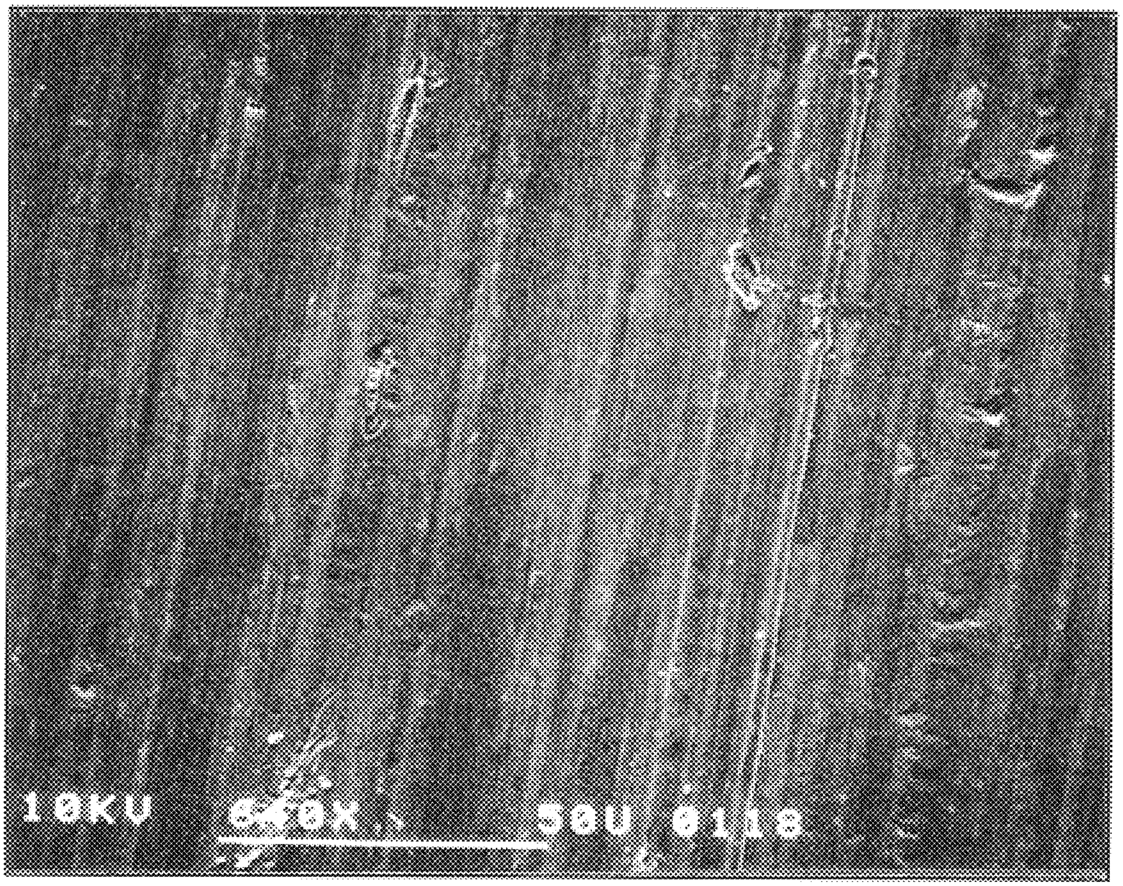
FIG. 1 shows the surface of the bright side of hard 1200 foil as rolled. The rolling direction is from 12.30 to 6.30, (when viewed as the hour hand on a clock face) and the same is true of FIGS. 2, 3 and 4.
Figure 2:
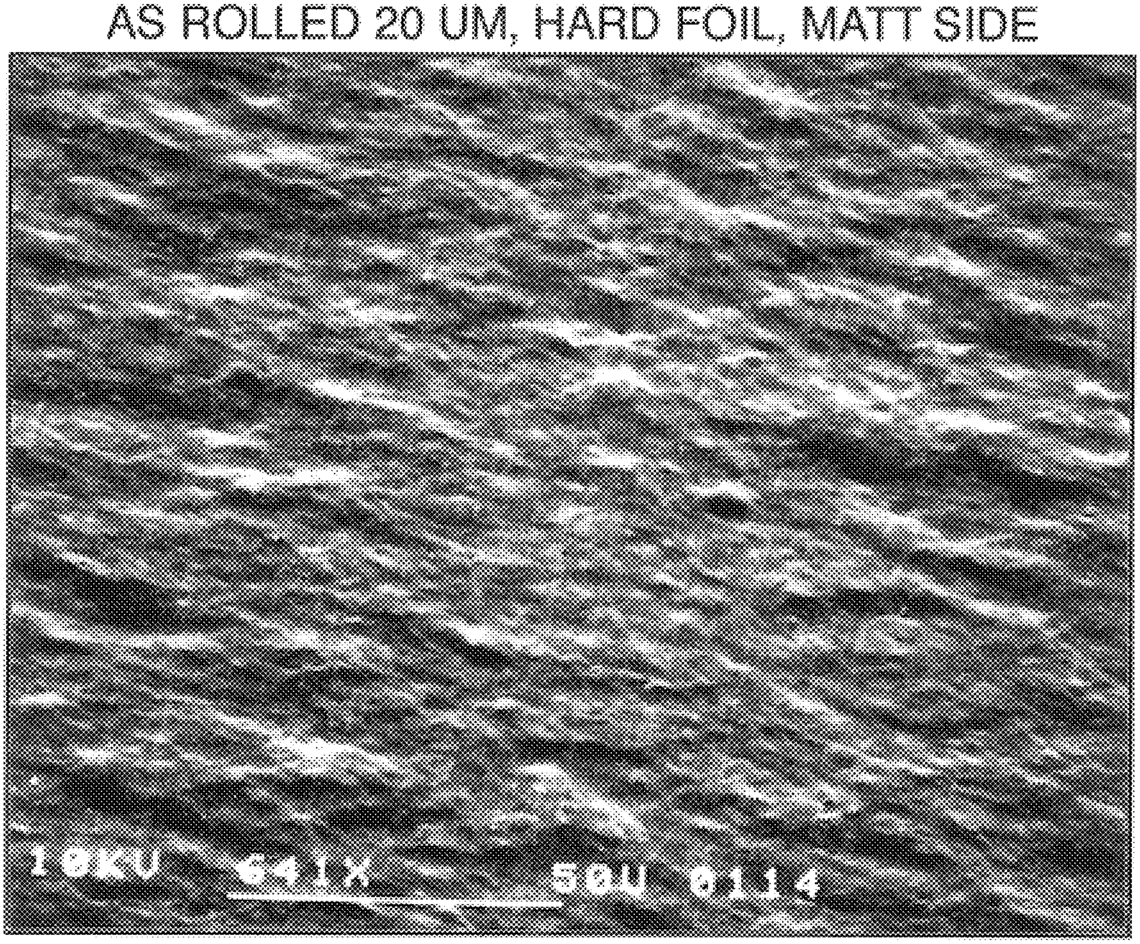
FIG. 2 is a corresponding picture of the matt side of the rolled sheet. The rippled topography, extending transverse to the rolling direction, can be clearly seen.

FIGS. 1 and 2 of the accompanying drawings are photomicrographs of the bright and matt sides of the 1200 sample whose roughness parameters are quoted in rows 3 and 4 of the above table.

On subjecting this hard foil sample to a standard nitric acid electrograining treatment lasting 30 seconds, surfaces typical of those obtained commercially were produced. By contrast, when annealed foil rather than hard foil was used, the graining response was not as uniform and larger plateaus were encountered with rougher pitting.

Figure 3:
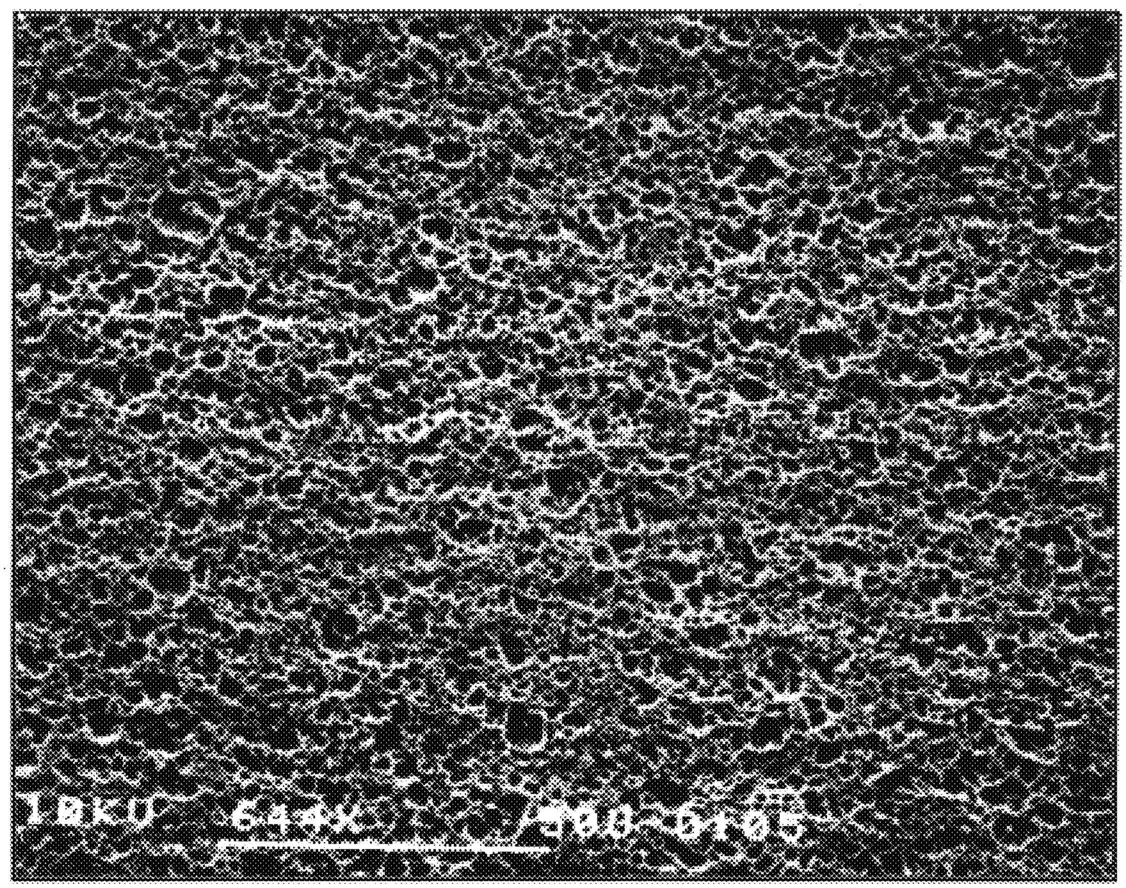
FIG. 3 is a photomicrograph of the bright side of the sheet, corresponding to FIG. 1, after it has been subjected to electrograining for 20 seconds at 14 V in 1.0% nitric acid with an electrode spacing of 1.5 cm.
Figure 4:
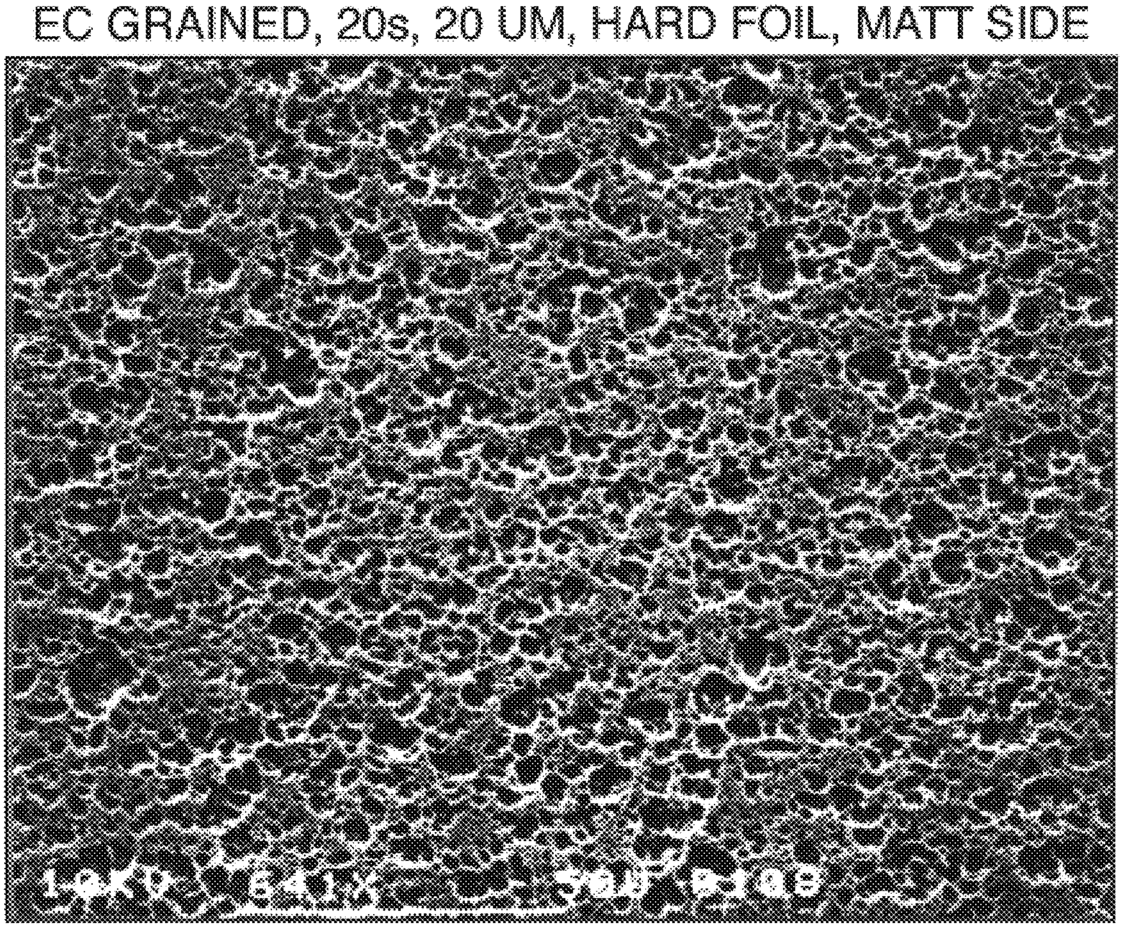
FIG. 4 is a corresponding picture of the matt side of the aluminium sheet, corresponding to FIG. 2, after having been subjected to electrograining under the same conditions as FIG. 3.

When the electrograining treatment time was reduced from 30 seconds to 20 seconds, it was found that the surface produced on the bright rolled side had more plateau areas and the rolling direction could be readily discerned by the unaided eye, while the matt side was satisfactory. FIGS. 3 and 4 are photomicrographs of these two surfaces. Thus a light electrograining treatment on the matt pack-rolled side of the sheet produced a litho sheet support that looked as though it would have had useful properties.

EXAMPLE 3

Ribbons of AA1050A aluminium sheet 0.65 mm thick, in an annealed condition achieved by a recovery anneal at 400° C. for 5 minutes, were pack rolled to give rise to sheets approximately 0.425 to 0.485 mm thick. The front matt surface of some of the samples was electrograined at 70 Amps for 5 seconds in 1.5% hydrochloric acid. This treatment results in a charge input about 25% of that required for commercial electrograining of conventional rolled sheet. The various samples were anodised to generate an anodic oxide film on the roughened surface at a rate of 2.4 g/m$^2$. Profilometry measurements were made using a mechanical stylus. It is accepted that a mechanical stylus gives roughness figures about half those obtained using a non-contact profilometer; commercial litho sheet support has an $R_a$ roughness typically in the range 0.4–0.5 μm and an $R_z$ roughness typically in the range of 3–6 μm.

The electrograined and anodised samples were used as supports for the preparation of lithographic plates which were employed in print runs. Results are set out in the following Table 2.

TABLE 2

| Sample | A | B | C | D |
|---|---|---|---|---|
| Thickness (μm) | 0.476 | 0.430 | 0.425 | 0.475 |
| Electrograining | 70 A 5 sec | — | — | 70 A 5 sec |
| Surface Roughness | | | | |
| $R_a$ (μm) | 0.74 | 0.78 | 0.80 | 0.78 |
| $R_z$ (μm) | 6.26 | 6.45 | 7.65 | 6.25 |
| Run clear | 25 | 35 | 40 | 25 |
| Impressions (×1000) | 130 | 1 | 1.5 | 120 |

Samples A and D were subjected to electrograining; samples B and C were not. This electrograining had little effect on the surface roughness figures, although $R_z$ was slightly increased. The run clear figure is the number of impressions that need to be run off the lithographic plate before a good clear image is obtained. The non-grained samples B and C needed a little longer to run clear than the grained samples A and D.

The final row of the table records the number of impressions obtained off the lithographic plate before failure; the figures are expressed in thousands.

The non-electrograined samples B and C failed after a few thousand impressions because the organic coating flaked off the support. This was presumed to be because the organic coating was not firmly bonded to the support. By contrast, the electrograined A and D gave print runs continuing to 120,000 or more impressions, equivalent to high performance commercial plates. It will be recalled that the samples A and D have advantages over commercial lithographic plates:

The samples were produced by pack rolling, two at a time, rather than by single rolling; and The samples received only a short electrograining treatment amounting to 25% of that required for the commercial litho plates.

Figure 5:
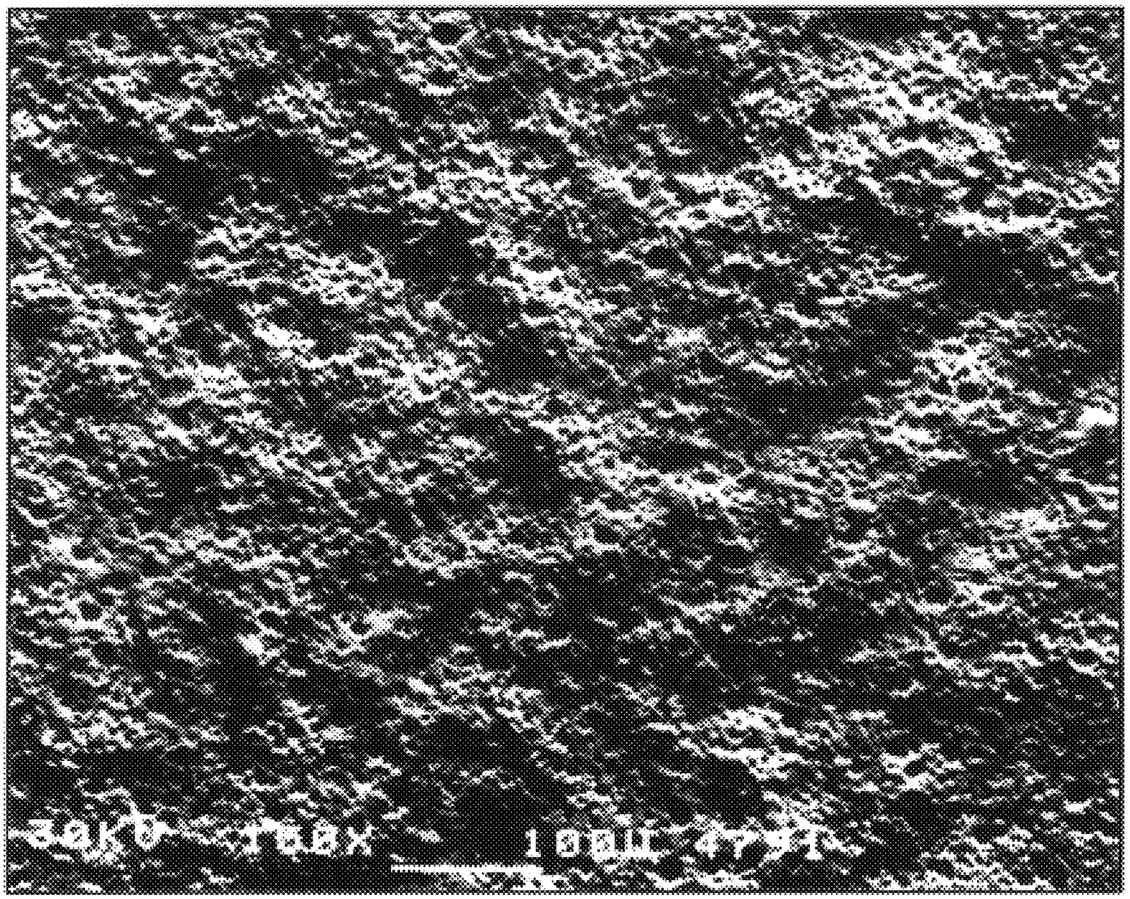
FIG. 5 is a photomicrograph (magnification ×150) of the surface of Sample A (Table 2, Example 3) in which a rippled topography and a superimposed pitted structure are clearly visible.

FIG. 5 is a micrograph of the surface of Sample A. A rippled topography extending generally horizontally, and a pitted structure, are clearly visible.

EXAMPLE 4

In order to further characterise a matt pack rolled lithographic surface, gloss and $R_a$ roughness measurements were made on a specimen of 0.3 mm gauge commercially rolled lithographic sheet, a commercially nitric acid electrograined lithographic plate also of 0.3 mm gauge and a sample of matt pack rolled sheet of gauge 0.5 mm. Gloss measurements were made at 20° to the surface normal either in the rolling direction or the transverse direction. (This angle was chosen as it represents a typical viewing angle when inspecting surfaces). The standard commercial as-rolled specimen had a gloss measurement of 121 gloss units in the rolling direction but only 62 gloss units in the transverse direction. It had a roughness, $R_a$, of 0.4 μm measured with a non-contact profilometer. These values indicate that this specimen had a highly reflective smooth and anisotropic surface. In contrast, the commercial electrograined sample had gloss values of 1.7 and 1.6 gloss units in the rolling and transverse directions respectively, which indicated a far more uniform, matt surface. This sample had a roughness of 1.14 μm. The matt pack rolled specimen had gloss values of 14 gloss units in both the rolling and transverse directions and a roughness of 1.24 μm. This showed that the matt pack rolled surface had a high degree of uniformity, that the coarse topography was already of the correct order for a lithographic substrate and that relatively little further fine roughening would be required to produce a surface having similar characteristics to a conventionally produced and high grade commercial plate.

We claim:

1. Rolled aluminium sheet having a surface that is uniformly rough by virtue of: a rippled topography comprising ridges and troughs extending transverse to a rolling direction and having an aspect ratio of at least 1.5 and an average spacing between adjacent ridges of 5–200 μm; and a pitted structure comprising pits having an average diameter of 1–20 μm and an aspect ratio of not more than 1.5.

2. A lithographic plate support comprising the rolled aluminium sheet of claim 1, wherein the roughness of the rippled topography is sufficient to make the surface water-retentive, and the roughness of the pitted structure is sufficient to permit a layer of an organic material to become firmly bonded to the surface.

3. A lithographic plate support as claimed in claim 2, wherein there is present an aluminium oxide film overlying the surface of the sheet.

4. A lithographic plate comprising the lithographic plate support as claimed in claim 3 and a layer of an organic material bonded to the aluminium oxide film and overlying a region of the surface of the sheet.

* * * * *